United States Patent
Kent et al.

[15] 3,667,301
[45] June 6, 1972

[54] CONTROL OF GYROSCOPE SPIN-UP DEVICES

[72] Inventors: Alan Hugh Kent, Wokingham; John Christopher Hammond Davis, Wargrave, both of England

[73] Assignee: Plessey Telecommunications Research Limited, Taplow, England

[22] Filed: Oct. 2, 1970

[21] Appl. No.: 77,593

[30] Foreign Application Priority Data

Oct. 3, 1969 Great Britain ..................... 48,745/69

[52] U.S. Cl. ............................................. 74/5.1, 74/5.43
[51] Int. Cl. ................................. G01c 19/26, G01c 19/52
[58] Field of Search ............... 74/5, 5.1, 5.12, 5.14, 5.43, 74/5.7

[56] References Cited

UNITED STATES PATENTS

| 2,315,019 | 3/1943 | Samuelson | 74/5.7 X |
| 3,055,635 | 9/1962 | Samet | 74/5.7 X |
| 3,020,769 | 2/1962 | Bentley et al. | 74/5.1 |
| 3,115,784 | 12/1963 | Parker | 74/5.12 |
| 3,451,289 | 6/1969 | Edmonds et al. | 74/5.43 |
| 2,181,250 | 11/1939 | Reichel | 74/5.7 |

Primary Examiner—Manuel A. Antonakas
Attorney—Scrivener, Parker, Scrivener and Clarke

[57] ABSTRACT

A gyroscope and spin-up system in which the gyroscope rotor is rotated by fluid from a spin-up device. Fluid pulses are generated as a result of fluid from the spin-up device striking pulse-generating fluid-receiving areas provided on the rotor. The number of pulses produced depends upon the speed of the rotor. The pulses act on a resonant means which operates at a predetermined rotor speed to cut off the supply of fluid to the spin-up system.

9 Claims, 5 Drawing Figures

CONTROL OF GYROSCOPE SPIN-UP DEVICES

This invention relates to spin-up devices for gyroscopes and has for an object to provide an improved gyroscope and spin-up system which automatically renders the spin-up drive inoperative when the gyroscope rotor has attained a predetermined speed.

According to the present invention, there is provided a gyroscope and spin-up system, comprising in combination:
  a gyroscope rotor having pulse-generating fluid-receiving areas;
  a supporting structure for said rotor;
  a spin-up device for said rotor including a fluid-outlet positioned adjacent said rotor;
  a fluid supply source for supplying pressurized fluid to said spin-up device;
  means for stopping said fluid supply source from supplying pressurized fluid to the spin-up device; and
  resonant means operated by fluid pulses generated as a result of fluid from said spin-up device striking said fluid-receiving areas of said rotor, said fluid-receiving areas of said rotor being so arranged that the number of pulses generated is dependent upon the speed of rotation of the rotor, and said resonant means being such that when the speed of rotation of the rotor exceeds a predetermined value then the number of pulses acting on said resonant means causes it to operate the said means for stopping the fluid supply source supplying further pressurized fluid to said spin-up device.

Preferably an automatic uncaging operation is also arranged to be initiated by, or together with, the power switch-off operation.

In a preferred form of the invention an element participating in the rotation of the gyroscope rotor is formed with at least one surface irregularity which is arranged to move in a circle intersecting the path of a fluid jet so as to create, during each passage, a pressure pulse in either of the fluid supply to the jet or in the jet fluid after this fluid has struck the said element, and these pulses are utilized, preferably after amplification in a fluidic amplifier system, to act upon a resonant system, for example a reed, and the increased amplitude of the oscillations of the resonant system when resonance is approached, is utilized to switch-off the power acting upon the spin-up motor. In the case of a spin-up device in which a jet of fluid acts upon buckets or other blade members or recesses of the gyroscope rotor, the increased amplitude of the oscillations may conveniently be utilized to cut-off the fluid jet acting upon the buckets or the like to spin up the gyroscope rotor, and the pulses may be produced by the jet pressure variation resulting from each passage of a bucket or the like. Alternatively a sensor jet may co-operate with an endless curve which is so arranged on the gyroscope rotor as to encircle the rotor axis and to intersect the jet a predetermined number of times during each revolution of the rotor thereby varying, during each such intersection, the reaction pressure of the jet. The curve may be utilized to produce control pulses whose relative timing, dependent upon the position of the rotor axis relative to its mount, are additionally arranged to produce a control effect upon a servo system tending to maintain the gyroscope stator or mount in substantial alignment with the gyroscope axis.

In order that the invention may be more readily understood, two different embodiments, and variations thereof, will now be described with reference to the accompanying drawings, in which FIG. 1 is a sectional diagram, showing, together with its fluidic line connections, an embodiment in which the control pulses are produced by a fluid jet spin-up system acting in the manner of a tangential-flow turbine.

Figure 1:
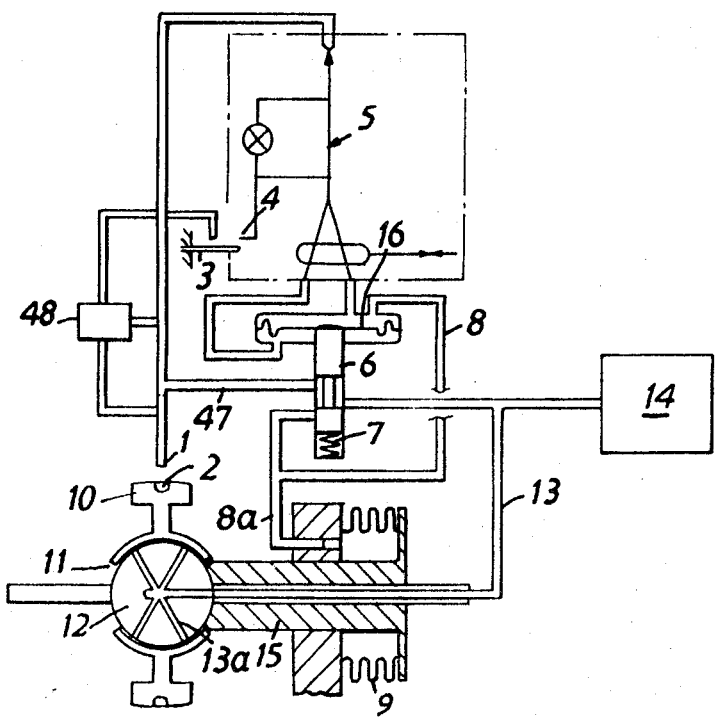

Referring now first to FIG. 1, a gyroscope rotor 10 is supported on a spherical stator 12 by a spherical air bearing to the air gap 11 of which air under pressure from a source 14 is fed via passages 13, 13a. A caging sleeve 15 is provided to directionally stabilize, during spinning-up, the axis of the rotor 10 relative to the stator structure. The manner of operation of this caging device is described in more detail in our co-pending British patent application No. 48149/69 filed Oct. 1, 1969 and the corresponding U.S.A. patent application Ser. No. 76,666 filed 30 Sept. 30, 1970. In order to permit the rotor 10 to be spun up for gyroscope operation, the rotor is provided at its circumference with abutments in the form of buckets 2 upon which a fluid jet produced by a spin-up nozzle 1 is arranged to act in a substantially tangential direction. The fluid jet is fed from the source 14 via a line 47 under the control of a slide valve 6, which is normally held by a spring 7 in the illustrated position establishing communication between the source 14 and the jet nozzle 1. The slide valve 6 is connected to a diaphragm 16 whose upper and lower sides respectively communicate with the two outlets of a bistable fluidic amplifier-switch 5 which at the beginning of the spin-up operation is biased to produce an excess of pressure at the lower side of the diaphragm 16 (as shown in the drawing), thus assisting the action of the spring 7 and maintaining the valve 6 in the illustrated position, in which fluid is admitted to the nozzle 1. The pressure pulses in the line 47 caused by the reaction of the buckets 2 on the jet nozzle 1 as they pass the outgoing jet are utilized to vibrate a reed 3. When the pressure pulses, preferably amplified by a suitable fluidic amplifier system 48, cause the amplitude of vibration of the reed to exceed a predetermined value, the reed 3 co-operates with a back-pressure sensor 4, and thus causes the bistable amplifier switch 5 to change its state. In the resulting state the switch 5 will produce a pressure excess at the upper side of the diaphragm 16 over the pressure at its lower side, and this pressure difference will move the valve element 6 down against the action of the bias spring 7, to a position in which it cuts off the supply of fluid from the source 14 to the jet nozzle 1 and thus the power supply to the spin-up device, and in which at the same time it will admit, through a feed-back line 8, pressure from the source 14 to the upper side of the diaphragm 16. This feed-back arrangement will maintain the piston 6 in its new position irrespective of discontinuation of the pressure supply from the bistable device 5. In addition the downward displacement of the slide-valve piston 6 opens a connection from the pressure source 14 via a branch 8a of the line 8 to a bellows 9, and the pressure thus produced in the bellows 9 will then act to withdraw the caging sleeve 15 from the illustrated caging position to a position clear of the rotor, thus allowing the rotor 10 to spin freely and adjust itself according to its gyroscope effect.

Figure 2:
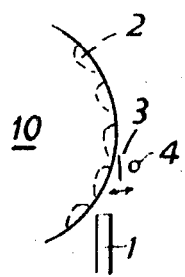
FIGS. 2 and 3 show fragmentary axial views of two variations in which the turbine-outlet stream is used to affect the resonant element, the embodiment of FIG. 2 relating likewise to a tangential-flow spin-up device, while that of FIG. 3 relates to an axial flow spin-up device.

While the embodiment illustrated in FIG. 1 utilizes the pressure pulses produced in the supply to the spin-up nozzle 1 during the passage of each bucket 5, FIG. 2 shows an alternative pulse-generating arrangement in which vibration of the reed 3 is produced by pressure pulses due to the variation of the flow of spin-up air after the latter has impinged upon the rotor 10, utilizing the fact that the direction and energy of this flow varies according as the jet impinges upon a bucket 2 or on the circumferential surface of the rotor body 10 between successive buckets.

Figure 3:
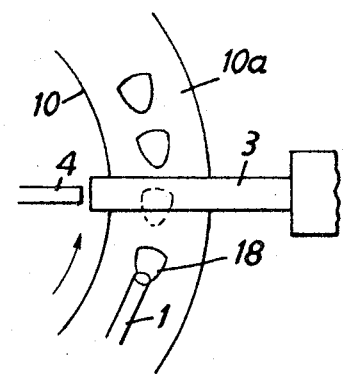

FIG. 3 shows another pulse-generating arrangement in which the reed 3 is also acted upon by the jet air after its impingement upon the rotor 10, but in which the jet nozzle 1 is arranged to produce a flow acting upon a facial surface 10a of the rotor 10, with an annular array of buckets 18 formed in this face.

Figure 4:
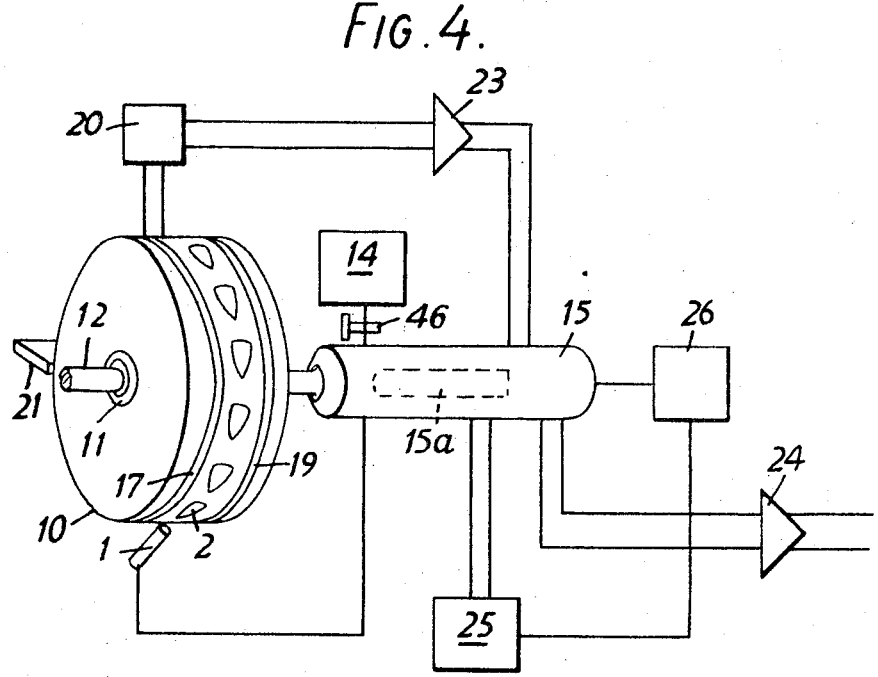
FIG. 4 is a partially perspective side view of an embodiment in which the control of the spin-up speed is combined with the servo control for a resetting device.

The embodiment illustrated in FIG. 4 comprises, like that of FIG. 1, a gyro-rotor 10 mounted on a stator 12 by means of a spherical air bearing having an air gap 11 and, as in the embodiment of FIG. 1, the rotor 10 is arranged to be spun up by a jet of air from a source 14, which is admitted by a nozzle 1 in an approximately tangential direction upon the circumferential surface of the rotor for which purpose this surface is equipped with buckets 2. In addition the rotor 10 is provided at its periphery with one or more raised endless ridges 17, 19, whose position along the rotor varies round the rotor axis, and which respectively face two pressure sensors 20 and 21, which are arranged in planes at right angles to each other about the axis of spin. These sensors are each arranged to direct a jet of fluid towards the rotor so that the reaction pressure in each sensor 20 and 21 varies according as the sensor outlet faces its associated ridge 17 or 19, which is at a relatively close distance from the sensor, or the surface of the drum 10 outside the ridge, which is spaced from the sensor by a greater distance. It will be readily appreciated that the two sensors 20 and 21 thus produce pulse-duration modulation (PDM) signals which digitally represent the right position, with the duration ratio varying in one direction or the other as the axis of spin of the rotor is altered relative to the stator axis. This form of device is more particularly intended for use in a rocket-propelled and/-controlled space vehicle having a known rate of spin about its own axis. The PDM signal may be amplified and used to steer the vehicle by, for example, thrust-vector control. In such a device the unavoidable delay in the amplifier chain for the vehicle control, combined with the rotation of the vehicle itself, can cause undesirable phase shifts in the direction of steering. These can, however, be exactly compensated if not only the rate of rotation of the vehicle and the delay but also the PDM frequency is known, and the present invention can be utilized to ensure that the ultimate spin-up speed, and thus the PDM frequency, conform with reasonable accuracy to a given value. In the embodiment illustrated in FIG. 4, the PDM signal is amplified during normal operation of the gyroscope by two amplifier stages 23 and 24, the amplifier 23 being a so-called cold-gas fluidic amplifier fed from a stored pressurized fluid supply, and the amplifier 24, which produces the power output, being preferably a hot-gas fluidic amplifier fed with rocket-motor propulsion gas.

During spin-up of the gyroscope rotor the pressure supply 14 is connected via a spin-up valve 46, which may be somewhat similar to the spin-up control valve 6, illustrated in FIG. 1, to the spin-up jet nozzle 1, and during this period the caging sleeve 15, which is shown in FIG. 4 in the withdrawn position, is held in co-operation with the gyro rotor 10 to ensure alignment of the spin of the latter with that of the vehicle. In order to ensure cut-off of the supply of fluid to the jet nozzle 1 when the desired spin-up speed has been reached, the output of the amplifiers 23 is connected by the caging sleeve 15, which, similarly to that in FIG. 1, is constructed as a multi-port pneumatic valve, to a resonant circuit 25. This resonant circuit 25 is arranged to act, when the resultant oscillation reaches a predetermined amplitude, upon a switch-off device 26, causing the latter to disconnect the power supply 14 from the jet nozzle 1 and to withdraw the caging sleeve 15 from the rotor 10. In order to ensure that the cut-off of the fluid supply to the nozzle 1 takes place before uncaging of the rotor, and thus to avoid any undesired effect of the spin-up jet upon the rotor after the latter has been uncaged, the valve sleeve to which the device 26 is coupled is preferably an auxiliary sleeve 15a which has a certain amount of lost motion relative to the caging sleeve 15, and which itself effects the cutting-off of the fluid supply to the nozzle 1 while the withdrawal of the caging sleeve 15 is effected either by mechanical action of the auxiliary sleeve 15a after the latter has produced cut-off of the jet supply, or by servo-action controlled by the new position of the auxiliary sleeve 15a, for example in a manner similar to that described with reference to FIG. 1.

Figure 5:
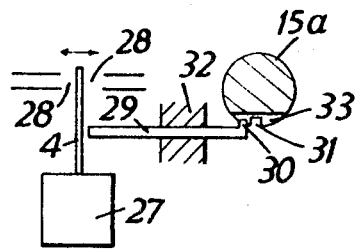
FIG. 5 shows details of suitable release mechanism.

FIG. 5 illustrates one form of trigger mechanism for effecting automatic cut-off of the power supply upon release of the caging sleeve 15 or of the auxiliary sleeve 15a. During spin-up of the rotor 10, air from the first-stage amplifier 23 of FIG. 4 is admitted to orifices 28 arranged at opposite sides of a reed 4 which is held in a base 27, and which is constructed to resonate at a frequency corresponding to the pulse-rate output of amplifier 23 when the rotor 10 rotates at the desired speed. As, during spin-up, the resonant frequency is approached, the amplitude of the vibration of the reed 4 builds up to act upon a locking slide 29 causing it to slide in its longitudinal direction along a guide 32, thereby displacing a laterally projecting tongue 30 of the locking slide 29 along a transverse groove 33 of the auxiliary slide 15a until the tongue 30 enters a longitudinal groove 31 of the auxiliary slide 15a and thus enables the auxiliary slide 15a to be rapidly moved by a spring (similar to spring 7 of FIG. 1) to effect cut-off of the air supply to spin-up nozzle 1, and to produce withdrawal of the caging sleeve 15.

It will be readily appreciated that this construction constitutes only one of a great number of possible arrangements for utilizing the amplitude of the oscillations of a resonant element to effect power cut-off for the spin-up drive and uncaging of the rotor, and that the resonant member need not necessarily be a reed but may instead be constituted by some other resonating device such, for example, as a tuning fork, or a balance wheel, both of which will be less affected by unwanted vibrations and accelerations of the body in which the gyroscope is employed. In cases in which the amplitude of the resonating device is too weak for its direct use in triggering, an increase in its amplitude may be effected, for example, by well-known fluidic means, and the pulsed output may be employed to trigger a bistable device the output of which would in turn affect triggering means of a valve or other device, for example in the manner described with reference to FIG. 1. Such an arrangement has also the advantage that chance vibrations and accelerations, for example during transport, would not cause spurious uncaging because such chance vibrations and accelerations would not lead to powering of the fluidic device.

According to a further possible modification the triggering of the resonator may be effected by well-known fluidic apparatus using, for example, Helmholtz resonators or delay lines, although these are liable to show an undesirable dependency on temperature and/or pressure.

What we claim is:

1. A gyroscope and spin-up system, comprising in combination:
   a gyroscope rotor having pulse-generating fluid-receiving areas;
   a supporting structure for said rotor;
   a spin-up device for said rotor including a fluid-outlet positioned adjacent said rotor;
   a fluid supply source for supplying pressurized fluid to said spin-up device;
   means for stopping said fluid supply source from supplying pressurized fluid to the spin-up device; and
   resonant means operated by fluid pulses generated as a result of fluid from said spin-up device striking said fluid-receiving areas of said rotor,
   said fluid-receiving areas of said rotor being so arranged that the number of pulses generated is dependent upon the speed of rotation of the rotor, and said resonant means being such that when the speed of rotation of the rotor exceeds a predetermined value then the number of pulses acting on said resonant means causes it to operate the said means for stopping the fluid supply source supplying further pressurized fluid to said spin-up device.

2. A gyroscope and spin-up system as claimed in claim 1, which includes caging means for the gyroscope rotor, and operative means operative to automatically effect uncaging of said rotor.

3. A gyroscope and spin-up system as claimed in claim 2 in which said operative means is operative to automatically effect uncaging of said rotor after operation of the said means for stopping the fluid supply source.

4. A gyroscope and spin-up system as claimed in claim 1 in which the said fluid-receiving areas are constituted by depressions in said rotor.

5. A gyroscope and spin-up system as claimed in claim 1 which includes a fluidic amplifier system for amplifying said pulses before they act on said resonant means.

6. A gyroscope and spin-up system as claimed in claim 1, in which said resonant means includes a reed.

7. A gyroscope and spin-up system as claimed in claim 1, in which said fluid pulses are generated in said spin-up device.

8. A gyroscope and spin-up system comprising in combination a gyroscope rotor having pulse-generating fluid-receiving areas;

a supporting structure for said rotor;

a spin-up device for said rotor including a fluid-outlet positioned adjacent said rotor;

a fluid supply source for supplying pressurized fluid to said spin-up device;

means for stopping said fluid supply source from supplying pressurized fluid to the spin-up devices;

resonant means operated by fluid pulses generated as a result of fluid from said spin-up device striking said fluid-receiving areas of said rotor; and at least one pressure sensor co-operating with at least one endless curve which is so arranged on said rotor as to encircle the rotor axis and to intersect a fluid jet from said pressure sensor a predetermined number of times during each revolution of said rotor, thereby varying the reaction pressure of the jet during each said intersection, said fluid-receiving areas of said rotor being so arranged that the number of pulses generated is dependent upon the speed of rotation of the rotor, and said resonant means being such that when the speed of rotation of the rotor exceeds a predetermined value then the number of pulses acting on said resonant means causes it to operate the said means for stopping the fluid supply source supplying further pressurized fluid to said spin-up device.

9. A gyroscope and spin-up system as claimed in claim 8, in which said at least one endless curve is arranged to produce control pulses whose relative timing, dependent upon the position of the rotor axis relative to its mount, are arranged to produce a control effect upon a servo system tending to maintain said gyroscope mount in substantial alignment with the gyroscope axis.

* * * * *